United States Patent
Murillo et al.

(10) Patent No.: US 10,963,293 B2
(45) Date of Patent: Mar. 30, 2021

(54) INTERACTIONS WITH CONTEXTUAL AND TASK-BASED COMPUTING ENVIRONMENTS

(71) Applicant: Microsoft Technology Licensing, LLC, Redmond, WA (US)

(72) Inventors: Oscar E. Murillo, Redmond, WA (US); Benjamin William Vanik, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 884 days.

(21) Appl. No.: 14/945,357

(22) Filed: Nov. 18, 2015

(65) Prior Publication Data

US 2016/0147565 A1 May 26, 2016

Related U.S. Application Data

(62) Division of application No. 12/973,919, filed on Dec. 21, 2010, now abandoned.

(51) Int. Cl.
*G06F 9/48* (2006.01)
*G06Q 10/06* (2012.01)
*G06F 3/0484* (2013.01)

(52) U.S. Cl.
CPC .......... *G06F 9/4825* (2013.01); *G06F 3/0484* (2013.01); *G06Q 10/06* (2013.01)

(58) Field of Classification Search
CPC .. G06F 17/30867; G06F 3/048; G06F 9/4825; G06F 3/0484; G06Q 10/06
See application file for complete search history.

(56) References Cited

U.S. PATENT DOCUMENTS 6,057,845 A 5/2000 Dupouy
6,192,343 B1 2/2001 Morgan et al.
(Continued)

FOREIGN PATENT DOCUMENTS

CN 1517870 8/2004
CN 1595359 3/2005
(Continued)

OTHER PUBLICATIONS

The Chinese Office Action dated Feb. 1, 2016 for Chinese patent application No. 201110443702.3, a counterpart foreign application of U.S. Appl. No. 12/978,661, 12 pages.
(Continued)

*Primary Examiner* — Beau D Spratt
(74) *Attorney, Agent, or Firm* — Arent Fox LLP

(57) ABSTRACT

Concepts and technologies are described herein for interacting with contextual and task-focused computing environments. Tasks associated with applications are described by task data. Tasks and/or batches of tasks relevant to activities occurring at a client are identified, and a UI for presenting the tasks is generated. The UIs can include tasks and workflows corresponding to batches of tasks. Workflows can be executed, interrupted, and resumed on demand. Interrupted workflows are stored with data indicating progress, contextual information, UI information, and other information. The workflow is stored and/or shared. When execution of the workflow is resumed, the same or a different UI can be provided, based upon the device used to resume execution of the workflow. Thus, multiple devices and users can access workflows in parallel to provide collaborative task execution.

20 Claims, 8 Drawing Sheets

(56) References Cited

U.S. PATENT DOCUMENTS

| | | |
|---|---|---|
| 6,204,840 B1 | 3/2001 | Petelycky et al. |
| 6,260,035 B1 | 7/2001 | Horvitz et al. |
| 6,754,896 B2 | 6/2004 | Mishra et al. |
| 7,047,092 B2 | 5/2006 | Wimsati |
| 7,155,490 B1 | 12/2006 | Malmer et al. |
| 7,206,747 B1 | 4/2007 | Morgan et al. |
| 7,263,551 B2 | 8/2007 | Belfiore et al. |
| 7,383,460 B2 | 6/2008 | Sherwin, Jr. et al. |
| 7,543,238 B2 | 6/2009 | Alcazar et al. |
| 7,596,583 B2 | 9/2009 | Chang et al. |
| 7,831,585 B2 | 11/2010 | Ramsey et al. |
| 7,949,960 B2 | 5/2011 | Roessler et al. |
| 8,082,145 B2 | 12/2011 | Mowatt et al. |
| 8,112,473 B2 | 2/2012 | Saillet |
| 2002/0143949 A1 | 10/2002 | Rajarajan et al. |
| 2003/0135507 A1* | 7/2003 | Hind .............. G06F 17/30592 |
| 2004/0141013 A1 | 7/2004 | Alcazar et al. |
| 2004/0176958 A1 | 9/2004 | Salmenkaita et al. |
| 2005/0027480 A1 | 2/2005 | Qiao et al. |
| 2005/0132381 A1 | 6/2005 | Fiammante et al. |
| 2005/0147311 A1* | 7/2005 | Faber ..................... G06F 9/461 |
| | | 382/240 |
| 2005/0172282 A1 | 8/2005 | Shenfield et al. |
| 2005/0246726 A1 | 11/2005 | Labrou et al. |
| 2005/0283540 A1 | 12/2005 | Fux et al. |
| 2006/0085763 A1 | 4/2006 | Leavitt et al. |
| 2006/0101328 A1 | 5/2006 | Albornoz et al. |
| 2006/0136221 A1 | 6/2006 | James et al. |
| 2006/0235736 A1 | 10/2006 | Guckenheimer |
| 2006/0277166 A1 | 12/2006 | Vogler-Ivashchanka et al. |
| 2006/0277544 A1* | 12/2006 | Bjoernsen .............. G06Q 10/06 |
| | | 718/100 |
| 2007/0055529 A1 | 3/2007 | Kanevsky et al. |
| 2007/0118514 A1 | 5/2007 | Mariappan |
| 2007/0239637 A1 | 10/2007 | Paek et al. |
| 2008/0034088 A1 | 2/2008 | Suresh |
| 2008/0082929 A1 | 4/2008 | Stignani et al. |
| 2008/0134053 A1 | 6/2008 | Fischer |
| 2008/0154935 A1 | 6/2008 | Draeger et al. |
| 2008/0195571 A1 | 8/2008 | Furuuchi et al. |
| 2008/0195954 A1 | 8/2008 | Dharmarajan et al. |
| 2008/0215312 A1 | 9/2008 | Fux et al. |
| 2008/0221903 A1 | 9/2008 | Kanevsky et al. |
| 2008/0256544 A1 | 10/2008 | Eigler et al. |
| 2008/0294418 A1 | 11/2008 | Cleary et al. |
| 2008/0297484 A1 | 12/2008 | Park et al. |
| 2009/0113346 A1* | 4/2009 | Wickramasuriya ... G06F 3/0481 |
| | | 715/825 |
| 2009/0138872 A1 | 5/2009 | Fuchs et al. |
| 2009/0157653 A1 | 6/2009 | Herlocker et al. |
| 2009/0158167 A1* | 6/2009 | Wang ..................... G06F 3/0482 |
| | | 715/745 |
| 2009/0204954 A1 | 8/2009 | Malmer et al. |
| 2009/0293017 A1 | 11/2009 | Carter et al. |
| 2009/0307162 A1* | 12/2009 | Bui ......................... G06N 5/022 |
| | | 706/12 |
| 2009/0309849 A1 | 12/2009 | Iwema et al. |
| 2009/0327886 A1 | 12/2009 | Whytock et al. |
| 2010/0011319 A1 | 1/2010 | Gourdol et al. |
| 2010/0030785 A1 | 2/2010 | Wilson et al. |
| 2010/0058363 A1 | 3/2010 | Brun et al. |
| 2010/0107165 A1* | 4/2010 | Koskimies ............. G06Q 10/06 |
| | | 718/100 |
| 2010/0115445 A1 | 5/2010 | Jambor-sadeghi |
| 2010/0161720 A1 | 6/2010 | Colligan et al. |
| 2010/0217762 A1 | 8/2010 | Kajio et al. |
| 2010/0229112 A1 | 9/2010 | Ergan et al. |
| 2010/0250664 A1* | 9/2010 | Naka ...................... G06F 13/385 |
| | | 709/203 |
| 2010/0280983 A1 | 11/2010 | Cho et al. |
| 2010/0312547 A1 | 12/2010 | Van Os et al. |
| 2010/0318989 A1 | 12/2010 | Dureau et al. |
| 2010/0324993 A1 | 12/2010 | Kacholia et al. |
| 2011/0126154 A1 | 5/2011 | Boehler et al. |
| 2011/0167340 A1 | 7/2011 | Moore et al. |
| 2011/0202876 A1 | 8/2011 | Badger et al. |
| 2011/0208753 A1 | 8/2011 | Sivadas |
| 2011/0213655 A1* | 9/2011 | Henkin .................. G06Q 30/00 |
| | | 705/14.49 |
| 2011/0234488 A1 | 9/2011 | Ge et al. |
| 2012/0005596 A1* | 1/2012 | Carlson .................. G06F 9/445 |
| | | 715/751 |
| 2012/0005738 A1 | 1/2012 | Manini et al. |
| 2012/0124126 A1 | 5/2012 | Alcazar et al. |
| 2012/0166522 A1 | 6/2012 | MacLaurin et al. |
| 2015/0169285 A1 | 6/2015 | Reyes et al. |

FOREIGN PATENT DOCUMENTS

| | | |
|---|---|---|
| CN | 1954292 | 4/2007 |
| CN | 101180598 | 5/2008 |
| CN | 101197923 | 6/2008 |
| CN | 101256533 | 9/2008 |
| CN | 101710275 | 5/2010 |
| EP | 1445692 A2 | 8/2004 |
| EP | 1971118 | 9/2008 |
| WO | WO2006016307 | 2/2006 |
| WO | WO2009002999 | 12/2008 |

OTHER PUBLICATIONS

"Android Developer" retrieved on Jul. 16, 2010 at <<http://developer.android.com/guide/appendix/glossary.html>> Android 2.2 r1, 2010, 4 pages.

Clerckx, et al., Task-Based Design and Runtime Support for Multimodal User Interface Distribution, retrieved at: <<https://doclib.uhasselt.be/dspace/bitstream/1942/8027/1/Task%20Based.pdf>>, Proceedings of EHCI-HCSE-SDVIS'07, 2008, 18 pages.

Chinese Official Action dated Jan. 6, 2014, in Chinese Application No. 201110443702.3.

Chinese Official Action dated Oct. 10, 2014 in Chinese Application No. 201110364921.2.

Chinese Official Action dated Sep. 5, 2014, in Chinese Application No. CN 201110443702.3.

Chinese Official Action dated Jun. 4, 2014 in Chinese Application No. 201110364921.2.

Chinese Official Action dated Jun. 13, 2014, in Chinese Application No. CN 20111432255.1.

Chinese Official Action dated Nov. 11, 2013, in Chinese Application No. 201110364921.2.

Translated the Chinese Office Action dated Feb. 5, 2015 for Chinese patent application No. 201110432255.1, a counterpart foreign application of U.S. Appl. No. 12/973,919, 11 pages.

Translated the Chinese Office Action dated Feb. 25, 2015 for Chinese patent application No. 201110443702.3, a counterpart foreign application of U.S. Appl. No. 12/978,661, 6 pages.

Translated the Chinese Office Action dated Apr. 30, 2015 for Chinese patent application No. 201110364921.2, a counterpart foreign application of U.S. Appl. No. 12/947,833 , 6 pages.

Translated the Chinese Office Action dated Jul. 20, 2015 for Chinese patent application No. 201110443702.3, a counterpart foreign application of U.S. Appl. No. 12/978,661, 10 pages.

Chinese Official Action dated Oct. 10, 2014 iin Chinese Application No. 201110364921.2.

Search Report Issued in European Patent Application No. 11842165.0, dated Dec. 11, 2014, 6 Pages.

IAuxINP: "Input Device Engine", retrieved on Jul. 15, 2010 at: <<http://www.iauxsoft.com/iauxinp.html>>, iAuxSoft, 2008-2010, 3 pages.

International Search Repport dated Sep. 7, 2012, in International Application No. PCT/US11/067387.

International Search Report dated May 29, 2012, in International Application No. PCT/US11/060528.

PCT International Search for Application No. PCT/US2011/065704, dated Aug. 29, 2012, filing date: Dec. 19, 2011.

Laufs, et al., "MT4J—A Cross-platform Multi-touch Development Framework", ACM EICS 2010, Workshop: Engineering patterns for multi-touch interfaces, 2010, 6 pages.

(56) References Cited

OTHER PUBLICATIONS

Magic Mouse, retrieved on Jul. 15, 2010 at <<http://www.apple.com/magicmouse/>> Apple, Inc., 2015, 3 pages.
Moon, et al., "Context-Aware Active Services in Ubiquitous Computing Environments" retrieved at:<<http://dx.doi.org/10.4218/etrij.07.0106, 0075>>, ETRI Journal, vol. 29, No. 2, Apr. 2007, 10 pages.
"NetAlter Plans SOA-Based Browser", retrieved on Jul. 16, 2010 at <<http://www.webpronews.com/expertarticles/2006/05/08/netalter-plans-soabased-browser, WebProNews, May 2006, 2 pages.
O'Neill, et al., "Can we do without GUIs?" Gesture and speech interaction with a patient information system, Personal and Ubiquitous Computing, vol. 10, No. 5, Nov. 2005, 23 pages.
Office Action for U.S. Appl. No. 12/978,661, dated Jan. 16, 2015, MacLaurin et al., "Supporting Intelligent User Interface Interactions", 19 pages.
Office action for U.S. Appl. No. 12/973,919, dated Oct. 23, 2012, Murillo et al., "Interactions with Contextual and Task-Based Computing Environments", 20 pages.
Office Action for U.S. Appl. No. 12/947,833, dated Nov. 16, 2012, Alcazar et al., "Contextual and Task Focused Computing" 32 pages.
Office action for U.S. Appl. No. 12/978,661, dated Nov. 2, 2012, MacLaurin, et al., "Supporting Intelligent User Interface Interactions", 16 pages.
Office action for U.S. Appl. No. 12/947,833, dated Feb. 20, 2014, Alcazar et al., "Contextual and Task Focused Computing", 31 pages.
Office action for U.S. Appl. No. 12/978,661, dated Feb. 20, 2014, MacLaurin et al., "Supporting Intelligent User Interface Interactions", 20 pages.
Office Action for U.S. Appl. No. 12/947,833, dated Feb. 26, 2015, Alcazar et al., "Contextual and Task Focused Computing", 42 pages.
Office action for U.S. Appl. No. 12/973,919, dated Feb. 7, 2014, Murillo et al., "Interactions with Contextual and Task-Based Computing Environments", 25 pages.
Office action for U.S. Appl. No. 12/973,919, dated Mar. 20, 2013, Murillo et al., "Interactions with Contextual and Task-Based Computing Environments", 34 pages.
Office action for U.S. Appl. No. 12/973,919, dated Mar. 26, 2015, Murillo et al., "Interactions with Contextual and Task-Based Computing Environments", 31 pages.
Office action for U.S. Appl. No. 12/947,833, dated Apr. 17, 2013, Alcazar et al., "Contextual and Task Focused Computing", 50 pages.
Office action for U.S. Appl. No. 12/978,661, dated Jun. 20, 2014, MacLaurin et al., "Supporting Intelligent User Interface Interactions", 21 pages.
Office action for U.S. Appl. No. 12/978,661, dated Jul. 19, 2013, MacLaurin et al., "Supporting Intelligent User Interface Interactions", 21 pages.
Office action for U.S. Appl. No. 12/973,919, dated Jul. 28, 2014, Murillo et al., "Interactions with Contextual and Task-Based Computing Environments", 27 pages.
Office action for U.S. Appl. No. 12/973,919, dated Aug. 18, 2015, Murillo et al., "Interactions with Contextualand Task-Based Computing Environments", 31 pages.
Office action for U.S. Appl. No. 12/947,833, dated Sep. 10, 2014, Alcazar et al., "Contextual and Task Focused Computing", # pages.
Office action for U.S. Appl. No. 12/947,833, dated Sep. 10, 2013, Alcazar et al., "Interactions with Contextual and Task-Based Computing Environments", 23 pages.

"Open source innovation: eyeOS", retrieved Jul. 16, 2010 at <<http://www.computerworlduk.com/toolbox/open-source/open-source-business/in-depth/index.cfm?articleid=3353&pn=2>> Open source innovation on the cutting edge, May 2010, 4 pages.
Quigley, et al., "A task-based approach to data and context management in a virtual personal server space", retrieved at: <<http://sydney.edu.au/engineering/it/~bjornl/research/papers/task-based/comp-aquigley.pdf>>, Second International Conference on Pervasive Computing, Pervasiv, 2004, 5 pages.
Shankland, "Google integrates Picasa 3.8 and Picnik via cloud connection" retrieved on Sep. 29, 2010 at: <<http://asia.cnet.com/crave/2010/08/19/google-integrates-picasa-3-8-and-picnik-via-cloud-connection/>> Aug. 2010, 3 pages.
Shipka, "A Multimodal Task-Based Framework for Composing", National Council of Teachers of English, vol. 57, No. 2, Dec. 2005, 30 pages.
Soules et al., "Toward automatic context based attribute assignment for semantic file systems", retrieved at: <<http://www.shiftleft.com/mirrors/www.hpl.hp.com/personal/Craig_Soules/papers/CMU-PDL-04-105.pdf>>, Technical Report, Jun. 2004, 25 pages.
Waqar, "Designing application user interface for a variety of smartphones", retrieved Jul. 15, 2010 at <<http://mobtive.com/?p=4>>, MobTive, 2010, 2 pages.
Dix, et al., "From the Web of Data to a World of Action", In Web Semantics: Science, Services and Agents on the World Wide Web, vol. 8, No. 4, Nov. 1, 2010, pp. 394-408.
EP Search Report for Application No. 11853778.6 dated Jul. 16, 2015, a counterpart foreign applicaqtion of U.S. Appl. No. 12/978,661, 9 pages.
The Extended European Search Report dated Jan. 4, 2016 for European Patent Application No. 11850831.6, 11 pages.
Office action for U.S. Appl. No. 12/978,661, dated Dec. 1, 2015, MacLaurin et al., "Supporting Intelligent User Interface Interactions", 16 pages.
Paterno, et al., "Maria: A Universal, Declarative, Multiple Abstraction-Level Language for Service-Oriented Applications in Ubiquitous Environments", In Proceedings of the ACM Transactions on Computer-Human Interaction, vol. 16, No. 4, Nov. 1, 2009, 30 Pages.
"Final Office Action Issued in U.S. Appl. No. 12/978,661", dated Jun. 27, 2016, 19 Pages.
"Final Office Action Issued in U.S. Appl. No. 12/978,661", dated May 26, 2017, 21 Pages.
"Non-Final Office Action Issued in U.S. Appl. No. 12/978,661", dated Nov. 20, 2017, 18 Pages.
"Non-Final Office Action Issued in U.S. Appl. No. 12/978,661", dated Oct. 7, 2016, 18 Pages.
"Notice of Allowance Issued in Chinese Patent Application No. 201110432255.1", dated Aug. 17, 2015, 3 Pages.
"Office Action Issued in Chinese Patent Application No. 201110443702.3", dated Aug. 9, 2016, 11 Pages.
"Office Action Issued in European Patent Application No. 11853778.6", dated Mar. 28, 2018, 6 Pages.
"Final Office Action Issued in U.S. Appl. No. 12/978,661", dated Jun. 18, 2018, 20 Pages.
"Decision on Reexamination Issued in Chinese Patent Application No. 201110443702.3", dated Oct. 26, 2017, 22 Pages.
"Notice of Reexamination Issued in Chinese Patent Application No. 201110443702.3", dated Jun. 1, 2017, 16 Pages.
"Non Final Office Action Issued in U.S. Appl. No. 12/978,661", dated Feb. 14, 2019, 27 Pages.
"First Examination Report issued in Indian Patent Application No. 4471/CHENP/2013", dated Jun. 28, 2019, 5 Pages.

* cited by examiner

INTERACTIONS WITH CONTEXTUAL AND TASK-BASED COMPUTING ENVIRONMENTS

CROSS-REFERENCE TO RELATED APPLICATION

This application is a divisional of, and claims priority to, co-pending, commonly owned, U.S. patent application Ser. No. 12/973,919, filed Dec. 21, 2010, and entitled "Interactions with Contextual and Task-Based Computing Environments," which is herein incorporated by reference in its entirety.

BACKGROUND

Software packages traditionally are sold as bundles of functions and/or types of functions that software or application developers believe will be useful and/or popular with users. These software packages typically include a hard-coded user interface ("UI") that provides a carefully tailored user experience ("UX") to users of the software packages. The UI, and consequently the UX, of a software package often distinguishes one software package from another, as the underlying functionality of two or more software packages may be similar.

More particularly, software packages often are directed to providing a particular type of functionality. At any particular time, there may exist a number of software packages directed to a particular type of task or functionality, where the software packages may be provided by any number of developers. As such, the UIs and UXs associated with the software packages may vary widely, but the underlying functionality of the two software packages may have many similarities. For example, a particular function may be available in two or more software packages. UI controls associated with the particular function, however, may be located in different places in respective UIs, may have varied appearances, and/or otherwise may be varied among the various software packages.

In a task-based computing environment, tasks associated with one or more functions of a software package are provided to users via an appropriate interface. Software developers do not control the UI providing the tasks to the users. As such, the UX can vary widely, and it may be difficult for users to access certain tasks through a UI presented to the users. Because there may be no underlying data stored at a device until task execution is complete, interrupted tasks must be renewed and completed in their entireties.

It is with respect to these and other considerations that the disclosure made herein is presented.

SUMMARY

Concepts and technologies are described herein for interacting with contextual and task-focused computing environments. According to some embodiments of the concepts and technologies disclosed herein, a discovery engine collects application data that indicates functionality provided by applications. The discovery engine is configured to identify tasks, corresponding to particular functionality of the applications, that can be provided individually to users on-demand and/or in batches of tasks. In some embodiments, the applications are configured to declare tasks provided by the applications, which can allow the tasks to be exposed to users in a more streamlined manner.

UIs can be customized based upon the tasks identified as being relevant to activities occurring at a client device. The UIs can include one or more tasks and workflows corresponding to batches of tasks. The workflows can be executed via the client devices and can be interrupted during execution. When interrupted, the workflows are stored with data indicating progress in the workflow execution, contextual information associated with the device that initiated the workflow execution, a UI used to access the workflow, and other information. This information, referred to herein as the "workflow" can be stored and/or shared with other users. When execution of the workflow is resumed, the same UI can be provided, or a different UI can be generated and provided if the device used to resume execution of the workflow, and/or other contextual data associated with the device, differs from the stored contextual data. Thus, multiple devices and users can access workflows in parallel to provide collaborative task execution. Also, users can begin, interrupt, and resume execution of one or more workflows, if desired.

According to one aspect, application data corresponding to applications and/or software is generated. The application data is provided to or retrieved by the discovery engine. The discovery engine analyzes the application data to identify functionality provided by the applications. The discovery engine also generates, organizes, categorizes, and stores task data that describes and identifies tasks associated with the applications, the tasks corresponding to the identified functionality of the applications. The task data is stored in data store such as a database or server that is accessible to a task engine.

According to another aspect, the task engine obtains contextual data indicating activities at one or more client devices. Based upon the contextual data, the task engine searches or queries the task data to identify tasks that are expected to be relevant to the one or more client devices. The relevancy of the tasks can be determined based upon activities occurring at the client devices, files accessed at the client devices, activity history associated with the client devices, interactions between the client devices, and/or the like. The task engine also can obtain or access social networking data associated with a user of the client device. The social networking data can be used in addition to, or instead of, the contextual data to identify tasks that are believed to be relevant to the user of the client device based upon usage, comment, review, or rating by members of the user's social networks.

According to another aspect, the relevant tasks are identified by the task engine, and packaged for presentation to or use by the client device. The task engine is configured to generate a UI for interacting with the tasks and/or workflows corresponding to batches of the tasks, and to provide the UIs for consumption at a device. The task engine also is configured to determine a ranking and/or advertising scheme for the tasks and/or workflows based upon usage history associated with a client device, popularity of the tasks and/or workflows, advertising fees paid by vendors associated with the tasks, usage of the tasks by social network members, numbers of explicit searches for the tasks, other search or usage history of entities that have accessed the tasks, and the like. UI controls for accessing the determined tasks and/or workflows can be provided to the client device in a determined format. Metrics associated with the tasks, workflows, and UIs can be tracked and provided to one or more vendors associated with the tasks, if desired, and/or used for other purposes.

According to various embodiments, the client device is configured to execute a web-based operating system (OS). Thus, the client device may execute an operating system or other base program that is configured to access web-based or other remotely-executed applications and services to provide specific functionality at the client device. The client device therefore may provide various applications and services via a simple operating system or an application comparable to a standard web browser. It should be understood that the client device can execute other web-based and non-web-based operating systems, as is explained in more detail below.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
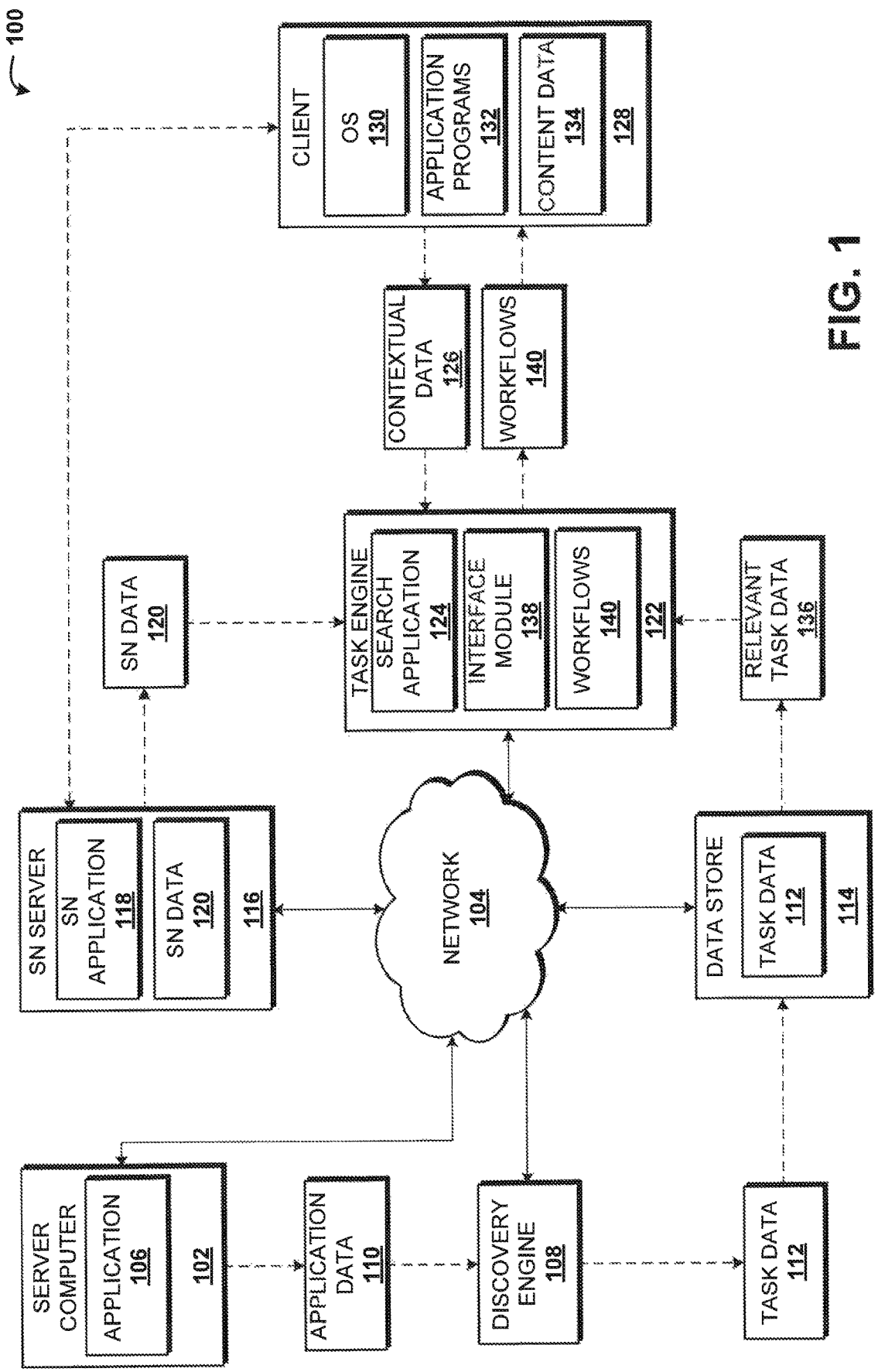
FIG. 1 is a system diagram illustrating an exemplary operating environment for the various embodiments disclosed herein.

The following detailed description is directed to concepts and technologies for interacting with contextual and task-focused computing environments. One or more tasks associated with applications are identified, and task data describing the tasks is stored in a searchable format and location. A task engine can search the task data to identify tasks and/or batches of tasks relevant to activities occurring at a client. The task engine also can be configured to customize UIs based upon the tasks identified as being relevant to activities occurring at a client device. The UIs can include one or more tasks and workflows corresponding to batches of tasks.

The workflows can be executed via the client devices and can be interrupted during execution. When interrupted, the workflows are stored with data indicating progress in the workflow execution, contextual information associated with the device that initiated the workflow execution, a UI used to access the workflow, and other information. The workflow can be stored and/or shared with other users. When execution of the workflow is resumed, the same UI can be provided, or a different UI can be generated and provided if the device used to resume execution of the workflow, and/or other contextual data associated with the device, differs from the stored contextual data. Thus, multiple devices and users can access workflows in parallel to provide collaborative task execution. Also, users can begin, interrupt, and resume execution of one or more workflows, if desired.

The word "application," and variants thereof, is used herein to refer to computer-executable files for providing functionality to a user. According to various embodiments, the applications can be executed by a device, for example a computer, smartphone, or the like. Additionally, the computer, smartphone, or other device can execute a web browser or operating system that is configured to access remotely-executed applications and/or services such as web-based and/or other remotely-executed applications, web pages, social networking services, and the like. In some embodiments, the applications, web pages, and/or social networking services are provided by a combination of remote and local execution, for example, by execution of JavaScript, DHTML, AJAX, .ASP, and the like. According to other embodiments, the applications include runtime applications built to access remote or local data. These runtime applications can be built using the SILVERLIGHT family of products from Microsoft Corporation in Redmond, Wash., the AIR and FLASH families of products from Adobe Systems Incorporated of San Jose, Calif., and/or other products and technologies.

The word "tasks," and variants thereof, is used herein to refer to a function and/or a set, subset, or category of functionality associated with an application, routine, or software package. Thus, an application can include any number of tasks, wherein the tasks define individual functions of the applications and/or types, sets, or subsets of the functions associated with the applications. For example, the tasks can include particular features of applications such as a task for playback of an audio file in the case of a media playback application. Similarly, the tasks can include multiple features associated with the applications such as macros and/or other automated tasks associated with an application. These examples are illustrative, and should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for interacting with contextual and task-focused computing environments will be presented.

Referring now to FIG. 1, aspects of one operating environment 100 for the various embodiments presented herein will be described. The operating environment 100 shown in FIG. 1 includes a server computer 102 operating on or in communication with a network 104. According to various embodiments, the functionality of the server computer 102 is provided by a web server operating on or in communication with the Internet, though this is not necessarily the case.

The server computer 102 is configured to execute an application 106 for providing functionality associated with the server computer 102. According to various embodiments, the application 106 provides a mapping application for providing maps, navigation instructions, location based services, and the like. The application 106 also can provide multimedia functionality such as, for example, video and audio streaming, video and audio playback functionality, and the like. The application 106 also can provide tools such as photo, video, and audio editing and creation applications, word processing functionality, data backup and storage functionality, calendaring applications, messaging applications such as email, text messaging, instant messaging, and realtime messaging applications, shopping applications, search applications, and the like. The application 106 also can provide rating and/or review applications, games, and the like. The above lists are not exhaustive, as the application 106 can provide any functionality associated with the server computer 102. While the embodiments described herein include applications 106 executing on server computers 102, it should be understood that client-centric approaches are also possible, wherein client devices execute applications that access data and/or applications hosted by the server computers 102, as described in more detail below. Furthermore, it should be understood that the applications 106 can be executed on the server computers 102 in part and on client devices in part. Thus, the above examples are exemplary and should not be construed as being limiting in any way.

The operating environment 100 further includes a discovery engine 108 operating on or in communication with the network 104. The discovery engine 108 can include a combination of hardware and software for discovering applications such as the application 106, and identifying one or more tasks provided by the applications. In some embodiments, the discovery engine 108 identifies or receives application data 110 corresponding to the application 106.

The application data 110 describes the application 106 and/or functionality associated therewith. The application data 110 can be generated by the application 106, for example via computer executable instructions that, when executed by the server computer 102 cause the server computer 102 to self-describe the application 106 and provide or make available the application data 110. In other embodiments, the discovery engine 108 or other devices or software such as search engines (not illustrated) identify and describe functionality associated with the server computer 102 and/or the application 106. The application data 110 corresponds, in some embodiments, to metadata describing the application 106 and/or functionality associated therewith.

In some embodiments, the discovery engine 108 analyzes the application data 110 and identifies one or more tasks provided by the application 106, as defined or described by the application data 110. The tasks describe particular functionality of the application 106. For example, if the application 106 provides photo editing functionality, the tasks provided by the application 106 can include, but are not limited to, red-eye removal tasks, color balancing tasks, special effects tasks, sharpness adjustment tasks, blemish removal tasks, image sizing and cropping tasks, blurring tasks, text editing tasks, contrast, hue, and brightness adjustment tasks, other tasks, combinations thereof, and the like. It should be understood that this embodiment is exemplary, and should not be construed as being limiting in any way.

The discovery engine 108 can generate data identifying the tasks associated with an application 106 and store the data as task data 112. In some embodiments, the discovery engine 108 also is configured to organize and categorize the task data 112 according to the tasks described by the task data 112. In the above example of an application 106 for photo editing, the discovery engine 108 can create a category of image editing tasks, wherein the image editing tasks correspond not only to the application 106, but also to other applications 106 provided by any number of server computers 102 or other devices. The discovery engine 108 can categorize and/or organize photo editing tasks for the applications 106 into an image editing category, for example. The discovery engine 108 also can be configured to store the task data 112 corresponding to the catalogued, categorized, and organized tasks for applications 106 at a data storage location such as the data store 114.

In some embodiments, application or task developers publish the task data 112 with the applications 106. For example, the developers can generate text descriptions and/or metadata describing the tasks, input or types of input recognized by the tasks, output or types of output generated by the tasks, keywords, limitations and/or capabilities of the tasks, and the like. Additionally, the applications 106 can be configured by developers to self-declare tasks. Thus, the application data 110 can be generated by the applications 106 without analysis or data farming by the discovery engine 108 or other devices or software. The task data 112 can be stored in a searchable format, if desired, such as extensible markup language ("XML"), text, and other formats. The task data 112 can be queried by devices to identify tasks based upon search query terms.

The functionality of the data store 114 can be provided by one or more databases, memory devices, server computers, desktop computers, mobile telephones, laptop computers, other computing systems, and the like. In the illustrated embodiments, the functionality of the data store 114 is provided by a database operating in communication with the network 104. In these embodiments, the data store 114 is configured to receive and respond to queries of the task data 112 by devices configured to communicate with the network 104. It should be understood that these embodiments are exemplary.

The operating environment 100 includes a social networking server 116 ("SN server") operating on or in communication with the network 104. The SN server 116 executes a social networking application 118 ("SN application") to provide social networking services. Exemplary social networking services include, but are not limited to, the MYSPACE social networking service, the FOURSQUARE geographic networking service, the TWITTER realtime messaging service, the FACEBOOK social networking service, the LINKEDIN professional networking service, the YAMMER office colleague networking service, and the like. In other embodiments, social networking functionality is provided by other services, sites, and/or providers that are not explicitly known as social networking providers. For example, some web sites allow users to interact with one another via email, commenting, ratings and reviews, real-time messages, chat services, gameplay, and/or other means, without explicitly supporting "social networking services." Examples of such services include, but are not limited to, the WINDOWS LIVE service from Microsoft Corporation in Redmond, Wash., among others. Therefore, it should be appreciated that the above list of social networking services is not exhaustive, as numerous social networking services are not mentioned herein.

The SN application 118 generates social networking data 120 ("SN data") associated with one or more users. The SN data 120 describes, for example, social networking graphs associated with users, user content such as status updates, photographs, reviews, links, and the like, contact and biographical information associated with users, and the like. The SN data 120 can include, for example, information describing applications or tasks accessed by users of the social networking service, links and status updates relating to applications and tasks, combinations thereof, and the like. The SN data 120 also can include other information such as likes and dislikes, user comments, user connection requests, and the like.

The operating environment 100 also includes a task engine 122 operating on or in communication with the network 104. The task engine 122 is configured to search for, identify, and provide tasks based upon one or more inputs. In some embodiments, the task engine 122 executes a search application 124 for searching the task data 112 for tasks relevant to a client 128 operating in communication with the task engine 122. According to various embodiments, the search application 124 bases searches of the task data 112, at least in part, upon contextual data 126 associated with the client 128.

According to various embodiments, the client 128 is a personal computer ("PC") such as a desktop, tablet, or laptop computer system. The client 128 may include other types of computing systems including, but not limited to, server computers, handheld computers, netbook computers, embedded computer systems, personal digital assistants, mobile telephones, smart phones, or other computing devices. Although connections between the client 128 and the network 104 are not illustrated in FIG. 1, it should be understood that the client 128 can communicate with the task engine 122 via the network 104. Furthermore, while only one client 128 is illustrated in FIG. 1, it should be understood that a user or combination of users may communicate with the task engine 122 using two or more clients 128.

The client 128 is configured to execute an operating system 130. According to various embodiments the operating system 130 executed by the client 128 is a web-based operating system. In some embodiments, the client 128 is not configured or equipped to execute traditional native applications and/or programs at the client-side, and instead accesses remotely-executed applications such as web applications and/or other remote applications, and renders the application data for presentation at the client 128. In still other embodiments, the client 128 is configured to access remotely-executed applications and to execute some local code such as scripts, local searches, and the like. As such, the client 128 can be configured to access or utilize cloud-based, web-based, and/or other remotely executed applications, and to render data associated with the applications at the client 128.

In some embodiments, the client 128 is further configured to execute applications programs 132. The application programs 132 can include a web browser or web-based operating system that is configured to access web-based or runtime applications, and to render the data generated by the web-based or runtime applications for use at the client 128. Thus, the application programs 132 can include one or more programs for accessing and rendering web pages, accessing applications, rendering data associated with the applications, accessing services, rendering data associated with the services, combinations thereof, and the like. In some embodiments, the client 128 also is configured to execute stand-alone or runtime applications that are configured to access web-based or remote applications via public or private application programming interfaces ("APIs"). Therefore, while the word "application" and variants thereof is used extensively herein, it should be understood that the applications can include locally-executed and/or remotely-executed applications.

The contextual data 126 describes contextual information associated with the client 128. The contextual data 126 identifies one or more applications 106 being accessed by the client 128, one or more application programs 132 being accessed or executed by the client 128, and/or content data 134 describing data being accessed, edited, created, saved, or otherwise worked with or processed by the OS 130, the applications 106, and/or the application programs 132. The content data 134 can describe documents, audio files, video files, web pages, programs, scripts, images, social networking content, spreadsheets, applications 106, other files and software, combinations thereof, and the like. Thus, the content data 134 can indicate usage or access of one or more web-based or other remotely-executed applications by the client 128, and what type of data is being processed by the one or more web-based or other remotely-executed applications. The content data 134 can be surfaced or provided to the task engine 122 as part of the contextual data 126.

The contextual data 126 also can describe one or more actions taken entirely at the client 128. For example, the contextual data 126 may indicate movement of a cursor or pointer at the client 128, alphanumeric text input at the client 128, clicking at a particular location or region of a display associated with the client 128, and/or other movements or inputs associated with the client 128. These and other inputs can prompt, for example, local execution of scripts and/or code at the client 128. These actions and other actions can be captured by the contextual data 126 and passed to the task engine 122. In some embodiments, these and other actions are mediated by a remote or local application, relative to the client 128, and therefore may be captured by the contextual data 126 not only as particular actions, but additionally, or alternatively, as specific invocation of particular functionality associated with the remote or local application, script, or code execution.

The search application 124 is configured to use the contextual data 126 to search the task data 112 for tasks that are expected to be relevant to the client 128 based upon the contextual data 126. As mentioned above, the search application 124 can be configured to query the task data 112, though other methods of searching content including the task data 112 can be used. In an exemplary embodiment, if the contextual data 126 indicates that the client 128 is accessing an image, the search application 124 queries the task data 112 to identify tasks related to images and/or tasks users often use when accessing images such as viewing tasks, editing tasks, printing tasks, and the like. Similarly, if the contextual data 126 indicates that the client 128 is accessing an audio file, the search application 124 can query the task data 112 to identify tasks related to audio files such as, for example, recording tasks, editing tasks, conversion tasks, audio processing tasks, and the like. These examples are illustrative, and should not be construed as being limiting in any way.

Although search engines are not illustrated in FIG. 1, search engines also can be used to generate or supplement the contextual data 126 with search histories, preferences associated with users, and the like. Thus, in addition to revealing activities associated with the client 128, the contextual data 126 can indicate activity associated with the client 128 over some time period, for example, during a session, day, week, month, year, and the like. Thus, the contextual data 126 can relate to some, none, or all interactions at the client 128 including web searches, application or task usage, email messaging usage, map usage, and the like.

In some embodiments, the search application 124 receives or retrieves the SN data 120 in addition to, or instead of, the contextual data 126. Additionally, or alternatively, search engines can retrieve the SN data 120 and supplement the contextual data 126 with the SN data 120. The search application 124 can use the SN data 120 to identify tasks or applications 106 used, consumed, reviewed, posted, commented on, or otherwise referenced by one or more members of a social network associated with a particular user, for example, a user associated with the client 128. Thus, the search application 124 can query the task data 112 to identify tasks based not only upon the contextual data 126 associated with the client 128, but also based upon one or more social networks corresponding to a user of the client 128.

In response to searches or queries of the task data 112, the task engine 122 can receive relevant task data 136 identifying tasks that are expected to be relevant to the client 128 based upon explicit search terms, the contextual data 126, and/or the SN data 120. The relevant task data 136 can identify the tasks or applications by one or more addresses, names, applications, categories, functionality descriptions, and the like. In some embodiments, application tasks are identified by one or more Internet protocol ("IP") addresses associated with server computers 102 hosting the applications 106 with which the tasks are associated, one or more uniform resource locator ("URL") addresses associated with the applications 106 associated with the application tasks, and/or other information for identifying the identity and/or location of the tasks.

In some embodiments, the task engine 122 includes an interface module 138. The interface module 138 is configured to determine how to present the tasks identified by the relevant task data 136 to the client 128. For example, the interface module 138 is configured to determine a layout for one or more user interfaces ("UIs") for presenting tasks at the client 128 or other devices. The interface module 138 determines, for example, how to arrange the tasks with respect to the one or more UIs, how to group tasks, what type of UI should be presented, and the like. The type of UI determined by the interface module 138 can include, but is not limited to, one or more of a mobile UI such as a smart phone web browser UI or smart phone web-based OS UI, a desktop PC web browser UI or a desktop PC web-based OS UI, a UI associated with the application 106, a tablet UI, other UIs, combinations thereof and the like.

The interface module 138 also can determine how to rank tasks and/or arrangements or orders in which to present the ranked tasks. The interface module 138 also can identify advertising for presentation with the UIs, as well as arrangement, ranking, layout, and/or other options for the advertising and/or other aspects of the UIs. In some embodiments, the interface module 138, the search application 124, and/or a combination thereof, identify, configure, provide data for presenting, and manage one or more workflows 140.

The workflows 140 correspond to batches of tasks and/or data associated with batches of tasks and/or related tasks. The workflows 140 can include data identifying a batch of tasks, contextual data 126 associated with the workflow 140, a user or client 128 associated with the workflow 140, and/or other information associated with the workflow 140. One exemplary workflow 140 includes a trip planner workflow 140. A trip planner workflow 140 can include one or more tasks for searching and booking flights or other transportation, tasks for search and reserving hotel or other accommodations, tasks for searching for restaurants and reviews associated with the restaurants, tasks for making reservations at restaurants, tasks for searching for a booking rental cars, and/or other travel-related tasks. According to embodiments, the workflows 140 are tailored by users to include desired tasks, tailored by the search application 124 and/or the interface module 138, saved by users, and/or otherwise configured. The workflows 140 can be interrupted or shared by users. Users can thus share workflows 140 to enable simultaneous interaction with the workflows 140 by one or more devices or users. The workflows 140 also can be interrupted and saved to allow users to interrupt execution of the workflows 140 and later resume execution of the workflows 140.

Grouping tasks in workflows 140 also can provide the ability to associated data used, consumed, submitted, or otherwise generated with respect to one task to be propagated to other tasks that are part of the same or a related workflow 140. Thus, for example, a user may access a workflow 140 to plan a trip or vacation. In the midst of executing the workflow 140, the user may change the travel dates. Instead of having to search flights, hotels, car rentals, restaurants, events, and the like, with the new dates, the workflow 140 can be used to propagate the changes through the other tasks, thereby allowing the user to avoid duplicative work. If the workflows 140 are interrupted, the task engine 122 can store contextual data 126 associated with a particular instance of the workflow 140 and/or other information such as data identifying an execution point in the workflow 140, a device being used to execute the workflow 140, and the like. Thus, when execution of the workflow 140 resumes, the task engine 122 can determine if the UI determined by the task engine 122 when execution of the workflow 140 should be used for the remainder of the workflow 140 execution, or if a new UI should be presented to a device resuming execution of the workflow 140.

In another embodiment, users can share workflows 140 with other users or devices. The task engine 122 can be configured to enable workflow 140 sharing. For example, the task engine 122 can be used to generate access codes or links that can be shared with other users or devices to access the workflow 140. Thus, one or more users and/or devices can access and execute a workflow 140 in parallel and/or in succession.

Although the search application 124 and the interface module 138 are illustrated as components of the task engine 122, it should be understood that each of these components, or combinations thereof, may be embodied as or in stand-alone devices or components thereof operating on or in communication with the network 104 and/or the client 128. Thus, the illustrated embodiment is exemplary, and should not be construed as being limiting in any way. Additionally, while FIG. 1 illustrates one server computer 102, one network 104, one discovery engine 108, one data store 114, one SN server 116, one task engine 122, and one client 128, it should be understood that some implementations of the operating environment 100 include multiple server computers 102, multiple networks 104, multiple discovery engines 108, multiple data stores 114, multiple SN servers 116, multiple task engines 122, and/or multiple clients 128. Thus, the illustrated embodiments should be understood as being exemplary, and should not be construed as being limiting in any way.

Figure 2A:
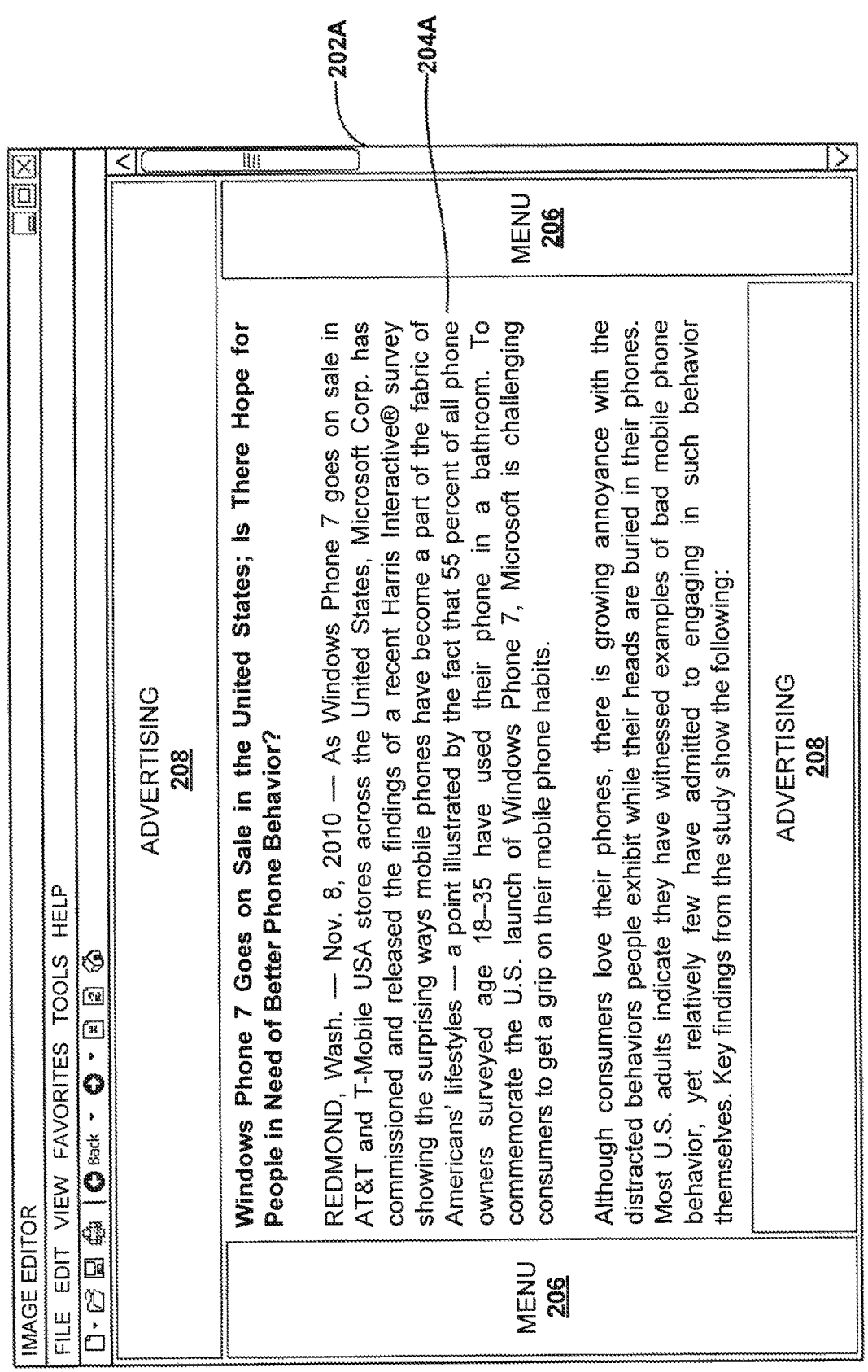
FIGS. 2A-2C are user interface diagrams showing aspects of exemplary user interfaces for interacting with contextual and task-focused computing environments, according to various embodiments.

Turning now to FIG. 2A, a user interface diagram showing aspects of a user interface (UI) for presenting tasks at the client 128 in one embodiment will be described. In particular, FIG. 2A shows a screen display 200A generated by one or more of the operating system 130 and/or the application programs 132 executed by the client 128 according to one particular implementation presented herein. It should be appreciated that the UI diagram illustrated in FIG. 2A is exemplary. Furthermore, it should be understood that data corresponding to the UI diagram illustrated in FIG. 2A can be generated by the interface module 138, made available to or transmitted to the client 128, and rendered by the client 128, though this is not necessarily the case.

In the illustrated embodiment, the screen display 200A includes an application window 202A. In some implementations, the application window 202A is displayed on top of or behind other information (not illustrated) displayed on the screen display 200A. Additionally, or alternatively, the application window 202A can fill the screen display 200A and/or can be sized to fit a desired portion or percentage of the screen display 200A. It should be understood that the illustrated layout, proportions, and contents of the illustrated application window 202A are exemplary, and should not be construed as being limiting in any way.

The exemplary application window 202A corresponds to an application window for a web browser, though this example is illustrative. It should be understood that the application window 202A can correspond to an application window for other applications, including native applications such as the application programs 132, web applications, the applications 106, and/or interfaces displayed or rendered by the operating system 130. In the illustrated embodiment, the application window 202A is displaying content 204A. It should be understood that this embodiment is exemplary, and should not be construed as being limiting in any way.

The application window 202A also is displaying two menu areas 206 ("menus"). While the menus 206 are illustrated as areas on the right and left sides of the application window 202A, it should be understood that one or more menu areas can be displayed as floating windows in the application window 202A and/or as areas docked to one or more of a side, top, and/or bottom of the application window 202A, placed into a tool bar or status bar of the application window 202A, and the like. Furthermore, the illustrated size, shape, and configuration of the menus 206 is exemplary and should not be construed as being limiting in any way. In some embodiments, the application window 202A is superimposed in "front" of the content 204A. The menus 206 can be rendered when the application window 202A is rendered and/or can be rendered in response to a keystroke, gesture, voice command, touch command, and/or manipulation of another input devices such as a mouse. The menus 206 can be configured to be only partially opaque, such that the content 204A and the menus 206 are simultaneously visible.

The menus 206 are configured to display UI controls for accessing tasks, workflows 140, and/or resources or links relating to the content 204A. In the illustrated embodiment, the content 204A corresponds to a news article. Thus, the menus 206 can include UI controls for various tasks and/or workflows 140 associated with the news article such as publishing tasks, printing tasks, research tasks, text extraction tasks, review tasks, and the like. As will be explained in more detail herein, the UI controls displayed in the menus 206 can be ordered based upon ranking and/or advertising schemes, wherein UI controls associated with tasks or workflows 140 are ordered based, at least in part, upon anticipated relevance, ranking or advertising programs, and the like. The screen display 200A also includes advertising areas 208 ("advertising") for displaying advertising content. The advertising content can correspond to one or more tasks or workflows 140, if desired, and/or can be targeted advertising based upon the content 204A, one or more users associated with the client 128, and/or other considerations.

According to embodiments, the content, size, configuration, layout, and ordering of the UI controls and advertising in the menus 206 and advertising 208 are determined by the task engine 122 based upon the contextual data 126, the SN data 120, capabilities associated with the client 128, and/or other information. In some embodiments, the task engine 122 is configured to present certain tasks, workflows 140, and/or types of tasks and workflows 140 in designated locations on the screen display 200A. Thus, the interface module 138 can provide a consistent UX to users with regard to particular types of content such as the content 204A, regardless of one or more sources associated with the tasks and/or workflows 140.

Figure 2B:
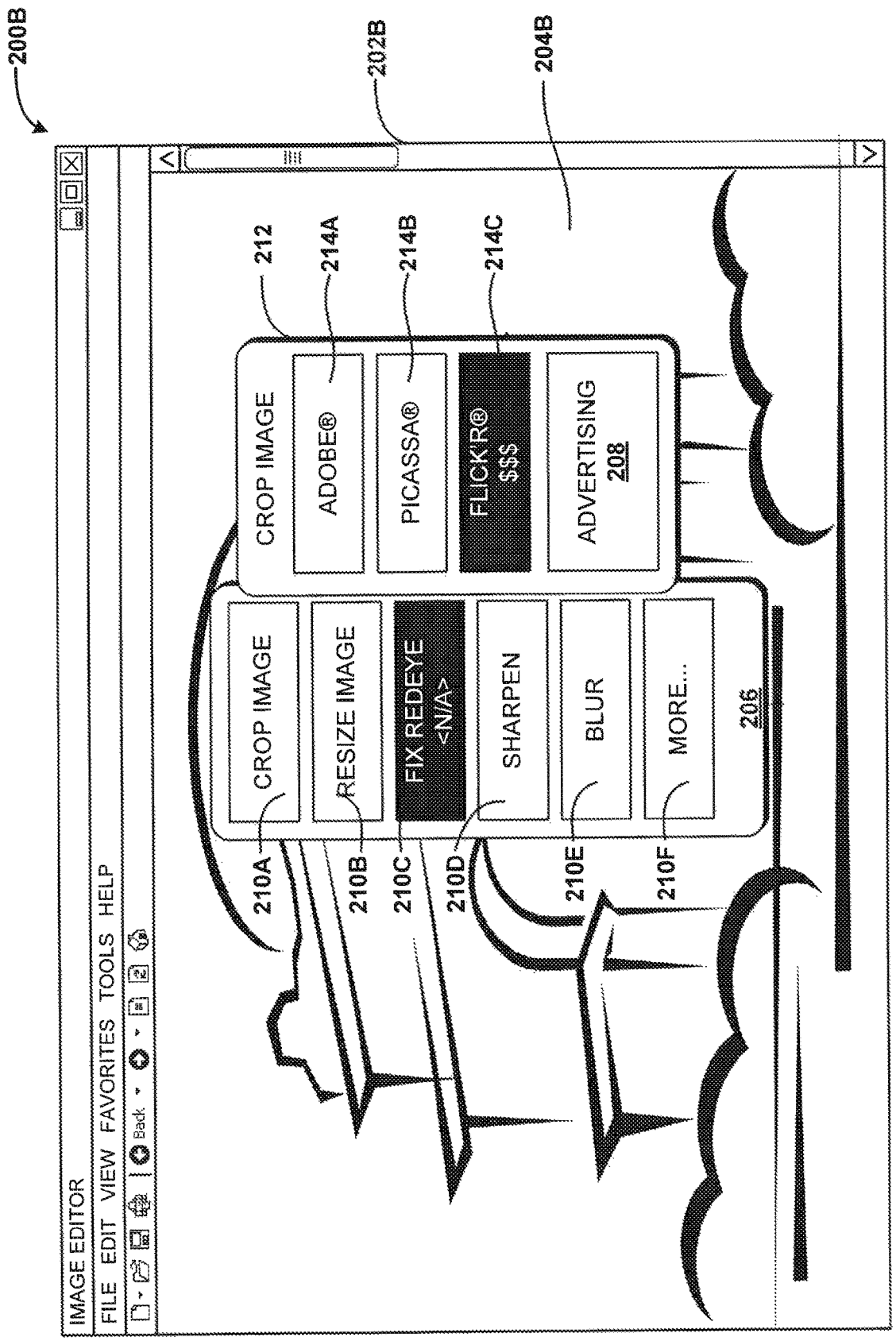

Turning now to FIG. 2B, a user interface diagram showing aspects of a user interface (UI) for presenting tasks at the client 128 in another embodiment will be described. In particular, FIG. 2B shows a screen display 200B generated by one or more of the operating system 130 and/or the application programs 132 executed by the client 128 according to one particular implementation presented herein. It should be appreciated that the UI diagram illustrated in FIG. 2B is exemplary. As explained above with regard to FIG. 2A, it should be understood that data corresponding to the UI diagram illustrated in FIG. 2B can be generated by the interface module 138, made available to or transmitted to the client 128, and rendered by the client 128, though this is not necessarily the case.

The screen display 200B includes an application window 202B that can be sized according to various sizes, shapes, and configurations and is not limited to the illustrated content, size, or configuration. In the illustrated exemplary embodiment, the application window 202B includes the content 204B displayed in the application window 202A. The content 204B corresponds to an image. It should be understood that this embodiment is exemplary, and should not be construed as being limiting in any way.

As illustrated in FIG. 2B, the menu 206 is displayed in front of the content 204B. Display of the menu 206 can be triggered, for example, by keystrokes, mouse movements, mouse clicks, gestures, touch commands, voice commands, and/or other actions. The menu 206 includes UI controls 210A-210F herein collectively referred to as the UI controls 210. Selection of the UI controls 210 can trigger the associated tasks or workflows 140. As illustrated in FIG. 2B, the UI controls 210 can correspond to various tasks and workflows 140 for editing images, though other tasks such as sharing tasks, printing tasks, commenting and reviewing tasks, and the like, are contemplated.

In the illustrated embodiment, the UI control 210C corresponds to a "fix redeye" task for removing redeye from photographs. In the illustrated embodiment, the UI control 210C is displayed in a format indicating that the task is not available or not relevant to the content 204B. It should be understood that in some embodiments the UI control 210C is replaced with a UI control for triggering an available task and that other methods of indicating that a task is unavailable or unnecessary are contemplated. It therefore can be appreciated from FIG. 2B that the task engine 122 can recognize from the contextual data 126 that some tasks and/or workflows 140 are not relevant to activity at the client 128 and/or other devices.

The screen display 200B also displays a secondary menu 212 corresponding to the menu 206. In the illustrated embodiment, the secondary menu 212 displays UI controls 214A-214C for triggering tasks or workflows 140. The UI controls 214A-214C correspond to three tasks or workflows for cropping images, and the display of the secondary menu 212 can be triggered by selection of the UI control 210A. The three tasks or workflows 140 corresponding to the UI controls 214A-214C can be substantially similar in terms of underlying functionality, but may be associated with three developers, suppliers, sites, interfaces, and the like. As shown, users may be charged for access to a task or workflow 140 corresponding to the UI control 214C. Thus, the UI control 214C can be displayed in a manner that conveys to the user that a fee must be paid to access the task or workflow 140. It should be understood that the illustrated scheme for identifying restricted tasks or workflows 140 can be varied depending upon any desired criteria. Thus, it should be understood that the illustrated embodiment is exemplary, and should not be construed as being limiting in any way.

As shown in FIG. 2B, the screen display 200B also can display advertising 208. In the illustrated embodiment, the secondary menu 212 includes the advertising 208. It should be understood that this embodiment is exemplary, and should not be construed as being limiting in any way. The advertising 208 can be displayed in any desired location on the screen display 200B. Additionally, the UI controls 214A-214C can include advertising if desired. Although not shown in FIG. 2B, an interface for paying for access to tasks or workflows 140 can be presented in response to receiving selection of the UI control 214C, if desired. It also should be understood that the UI controls 210A-F and the UI controls 214A-C can be selected, ordered, and arranged in accordance with various advertising and ranking schemes, as well as other considerations such as user search and usage history, SN data 120, combinations and the like.

Figure 2C:
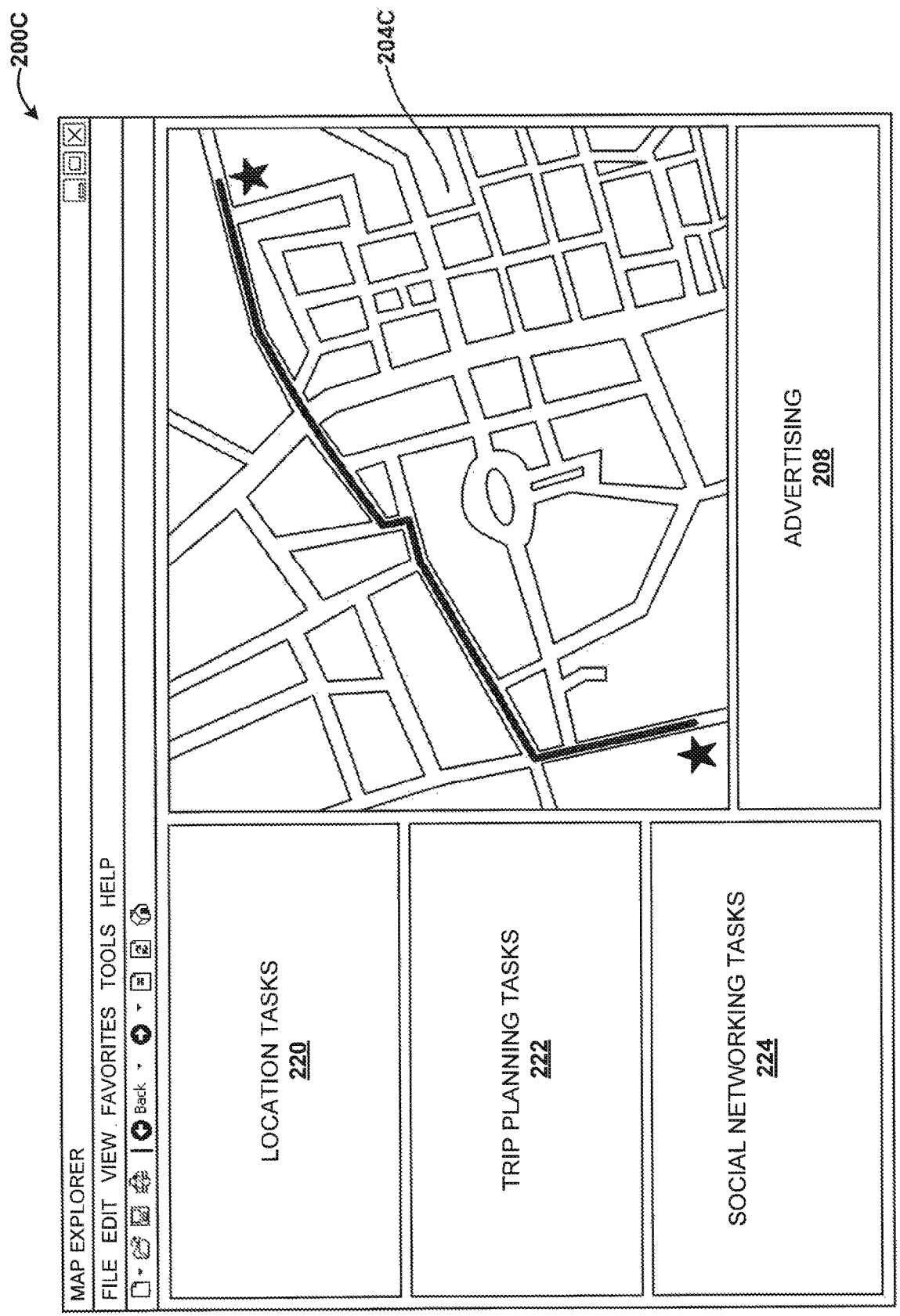

Referring now to FIG. 2C, a user interface diagram showing aspects of a user interface (UI) for presenting tasks at the client 128 in another embodiment will be described. In particular, FIG. 2C shows a screen display 200C generated by one or more of the operating system 130 and/or the application programs 132 executed by the client 128 according to one embodiment. It should be appreciated that the UI diagram illustrated in FIG. 2C is exemplary. As explained above, the UI diagram illustrated in FIG. 2C can be generated by the interface module 138, made available to or transmitted to the client 128, and rendered by the client 128, though this is not necessarily the case.

In the embodiment illustrated in FIG. 2C, the screen display 200C includes an application window 202C that can be sized and configured to various sizes and layouts, and is not limited to the illustrated content, size, or configuration. The application window 202C includes content 204C. In the illustrated embodiment, the content 204C corresponds to output generated via execution of the application 106, wherein the application 106 provides a mapping application. In the illustrated embodiment, the content 204C illustrates a route between two points. It should be understood that this embodiment is exemplary, and should not be construed as being limiting in any way.

The screen display 200C can include any number of UI controls for accessing tasks and/or workflows 140 associated with the content 204C. In the illustrated exemplary embodiment, the screen display 200C includes a location tasks area 220 ("location tasks"), a trip planning tasks area 222 ("trip planning tasks"), and a social networking tasks area 224 ("SN tasks"). It should be understood that this embodiment is exemplary, and should not be construed as being limiting in any way.

The location tasks 220 can be configured by the interface module 138 and can include UI controls for accessing one or more tasks or workflows 140 relating to the location(s) corresponding to the map displayed in the content 204C. Exemplary tasks and workflows include, but are not limited to, tasks for searching the displayed area for businesses, tasks for generating product price reports for stores in the displayed area, tasks for identifying social networking connections within the displayed area, tasks for generating navigation directions, other tasks, and the like. The location tasks 220 also can include one or more workflows 140 such as a restaurant reservation workflow 140, which can include a batch of tasks such as a task for polling one or more connections for a type of cuisine and/or a dining time, tasks for reviewing ratings of restaurants matching the type of cuisine and/or dining time identified by the polling, tasks for making reservations, tasks for generating calendar reminders relating to the tasks, other tasks, and the like. It should be understood that this embodiment is exemplary, and should not be construed as being limiting in any way.

The trip planning tasks 222 can include tasks and/or workflows 140 relating to trip planning. Exemplary trip planning tasks include, but are not limited to, tasks for booking flights or other travel arrangements, tasks for reserving hotel rooms or other accommodations, tasks for identifying attractions, other tasks, and the like. Additionally, the trip planning tasks 222 can include one or more workflows 140, as explained above. It should be understood that these tasks are exemplary, and should not be construed as being limiting in any way.

The SN tasks 224 can include various tasks and/or workflows 140 relating to social networking services. The SN tasks 224 can include, for example, tasks for searching the area corresponding to the displayed area for social networking connections, tasks for publishing location information to a social networking service, tasks for searching for social networking or realtime messaging updates emanating from the displayed area, and the like. The SN tasks 224 also can include workflows 140 relating to social networking services. It should be understood that these tasks are exemplary, and should not be construed as being limiting in any way.

The above examples are merely illustrative of how UI controls corresponding to tasks and/or workflows 140 can be displayed for users, and should not be construed as being limiting in any way. Additional and/or alternative categories of tasks and/or workflows 140 can be displayed with respect to the content 204C and/or other content, if desired.

Figure 3:
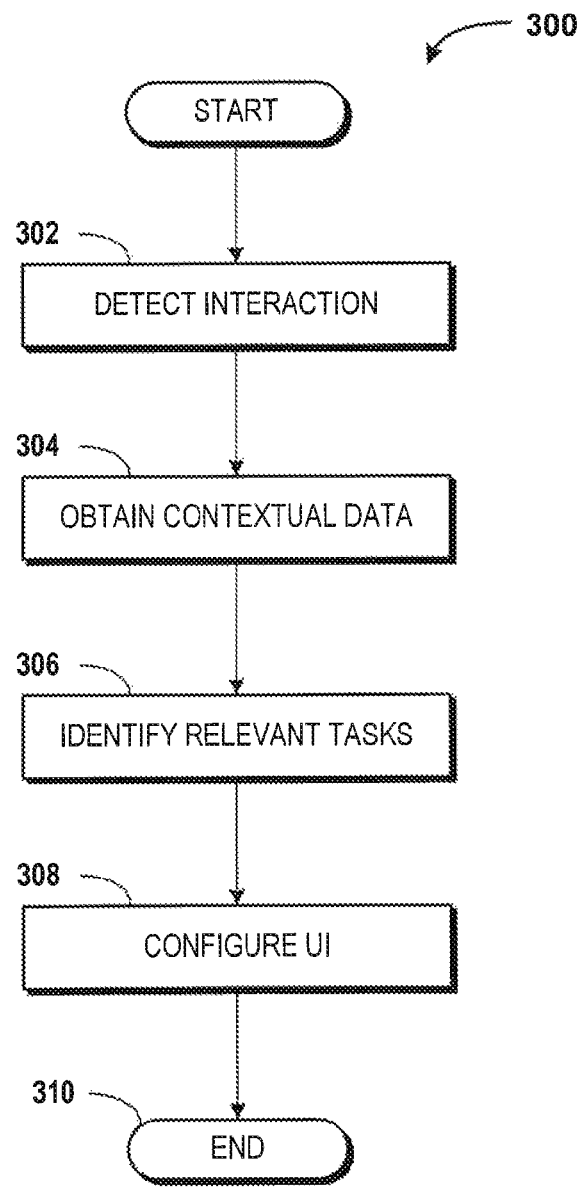
FIG. 3 is a flow diagram showing aspects of a method for providing tasks to a client, according to an exemplary embodiment.

Turning now to FIG. 3, aspects of a method 300 for providing tasks will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods disclosed herein, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the task engine 122. It should be understood that these embodiments are exemplary, and should not be viewed as being limiting in any way. Additional and/or alternative devices can provide the functionality described herein. The method 300 begins at operation 302, wherein the task engine 122 detects an interaction associated with the client 128. The interaction detected by the task engine 122 can include an interaction at the client 128, an interaction with one or more application programs 132 executing at the client 128, an interaction between the client 128 and one or more remotely executed or web-based applications such as the applications 106, and/or access or utilization of a web-based or other remotely executed application by the client 128.

It should be understood that the functionality of the task engine 122 can be provided by one or more of the application programs 132 executed by the client 128. Additionally, the functionality of the task engine 122 can be provided by the operating system 130 of the client 128 and/or by execution of one or more of the application programs 132 executing at the client 128. In other embodiments, the task engine 122 is in communication with the client 128 and detects interactions at the client 128. In any event, the task engine 122 can be configured to detect the interaction associated with the client 128.

From operation 302, the method 300 proceeds to operation 304, wherein the task engine 122 obtains the contextual data 126. As explained above with reference to FIG. 1, the contextual data 126 describes various aspects of one or more interaction(s) occurring at the client 128 such as one or more applications 106 or resources being accessed or utilized by the client 128, operations occurring at the client 128, the particular or types of application programs 128 executing at or being accessed by the client 128, content being used, consumed, or operated on by the client 128, combinations thereof, and the like. Thus, the contextual data 126 describes the types of interactions occurring at the client 128 and types of content being interacted with by the client 128.

From operation 304, the method 300 proceeds to operation 306, wherein the task engine 122 identifies one or more tasks that are relevant to the contextual data 126 associated with the client 128. As explained above, the task engine 122 searches or queries the task data 112 based upon the contextual data 126 to identify tasks that are relevant to activity associated with the client 128. For example, if the client 128 is interacting with a video file, the contextual data 126 may indicate this interaction, as well as file types associated with the video file and/or other information such as, for example, the size, resolution, length, frame rate, and the like, of the video file. Based, at least partially, upon this contextual data 126, the task engine 122 can identify tasks relevant to the client 128.

From operation 306, the method 300 proceeds to operation 308, wherein the task engine 122 configures a UI for interacting with the relevant tasks. As explained above with reference to FIGS. 1-2C, the task engine 122 populates menus and/or UI controls displayed on the menus, determines what tasks are or are not available, determines one or more ranking and/or advertising schemes for the UI controls, and configures the UI based upon these and/or other determinations. Also, the task engine 122 can configure and generate data for presenting one or more UI controls for accessing workflows 140. According to various embodiments, the task engine 122 configures the UIs based upon these and other determinations and makes data describing the UIs available to the client 128. From operation 308, the method 300 proceeds to operation 310. The method 300 ends at operation 310.

Figure 4:
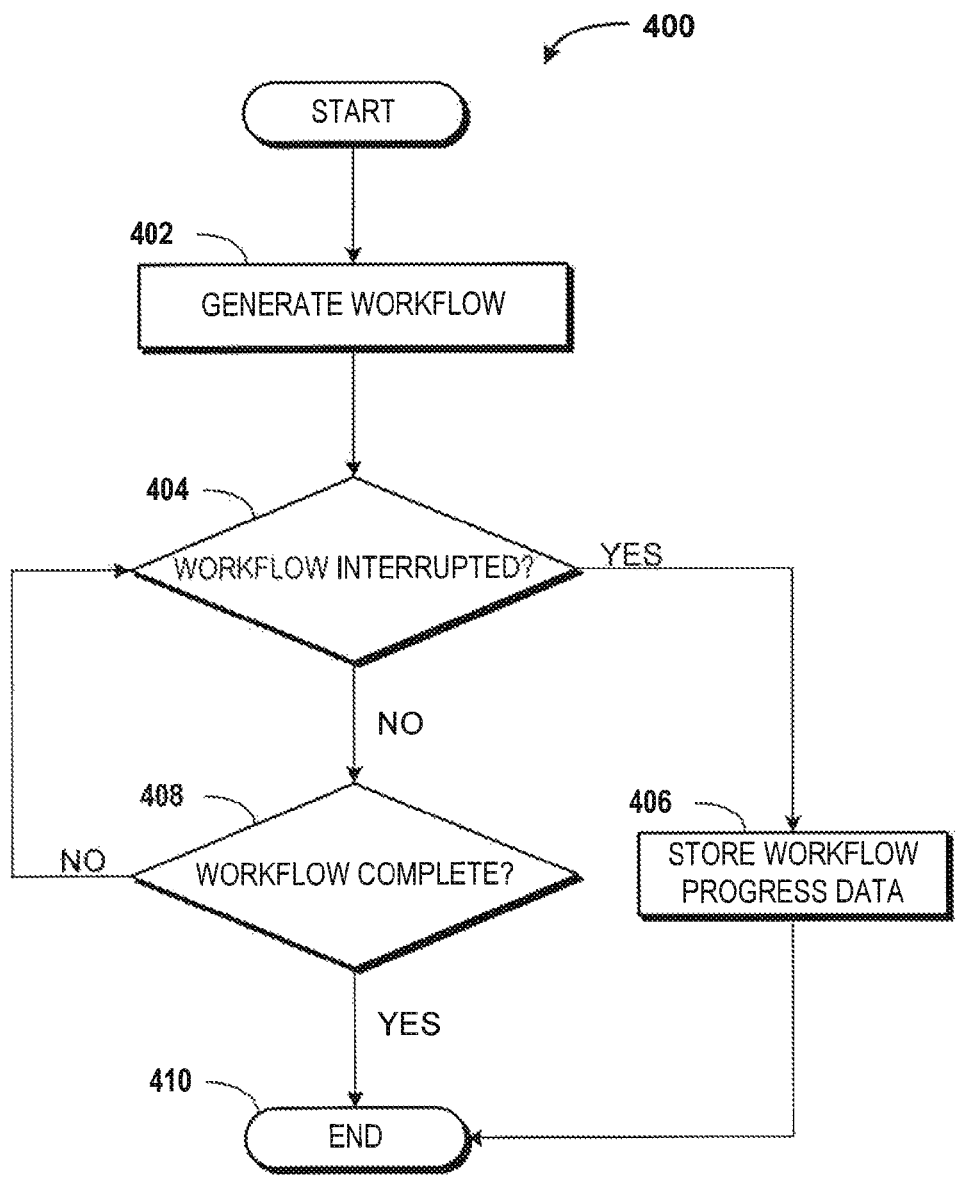
FIG. 4 is a flow diagram showing aspects of another method for providing tasks to a client, according to an exemplary embodiment.

Turning now to FIG. 4, aspects of another method 400 for providing tasks will be described in detail. The method 400 begins at operation 402, wherein the task engine 122 detects interactions with a workflow 140. As explained above, the workflows 140 can include data identifying bundles of tasks, as well as data indicating a execution point associated with the workflow 140, contextual data 126 associated with a device executing the workflow 140, other information, and the like. Although not illustrated in FIG. 4, it should be understood that the workflows 140 can be generated by users, application or task developers, the discovery engine 108, the search application 124, the task engine 122, and/or the interface module 138. Thus, it should be understood that the contents of the workflows 140 can be based upon one or more of user preferences, contextual data 126, histories associated with devices and/or users, SN data 120, developer information, other information, combinations thereof, and the like.

From operation 402, the method 400 proceeds to operation 404, wherein the task engine 122 determines if interactions with a workflow 140 have been interrupted. Execution of the workflows 140 can be interrupted for various reasons. For example, a device being used to execute a workflow 140 may lose network connectivity or power, a user may logout of a session via which interactions with the workflow 140 are controlled, a user may explicitly stop or pause execution of the workflow 140 to change devices or to share the execution of the workflow with other users or devices, and the like. In some embodiments, some tasks of a workflow 140 may not be executable on a smart phone being used to execute the workflow 140. Thus, when these tasks are encountered during execution of the workflow 140, the task engine 122 can inform the user and interrupt execution of the workflow 140. The workflows 140 can be interrupted for other reasons.

If the task engine 122 determines in operation 404 that execution of the workflow 140 has been interrupted, the method 400 proceeds to operation 406, wherein the task engine 122 stores workflow progress information and other information associated with the workflow 140 execution. The other information can include, but is not limited to, contextual data 126 associated with a device that began execution of the workflow 140, the next task in the workflow 140, a UI configured and presented to the user, other information, and the like. Thus, the task engine 122 can store various information allowing the workflow 140 to be resumed at another time, by another user, by another device, at another location, and the like. An exemplary method for resuming execution of the workflow 140 is described below with reference to FIG. 5.

If the task engine 122 determines in operation 404 that execution of the workflow 140 has not been interrupted, the method 400 proceeds to operation 408, wherein the task engine 122 determines if execution of the workflow 140 has completed. According to implementations, the task engine 122 can determine if all tasks associated with the workflow 140 have been executed, whether execution of the workflow 140 has been explicitly ended by a user, and the like. If the task engine 122 determines in operation 408 that execution of the workflow 140 has not been completed, the method 400 returns to operation 404. In some embodiments, the operations 404-408 may be iterated until the workflow 140 is interrupted or completed. If the task engine 122 determines in operation 408 that execution of the workflow 140 has been completed, or from operation 406, the method 400 proceeds to operation 410. The method 400 ends at operation 410.

Figure 5:
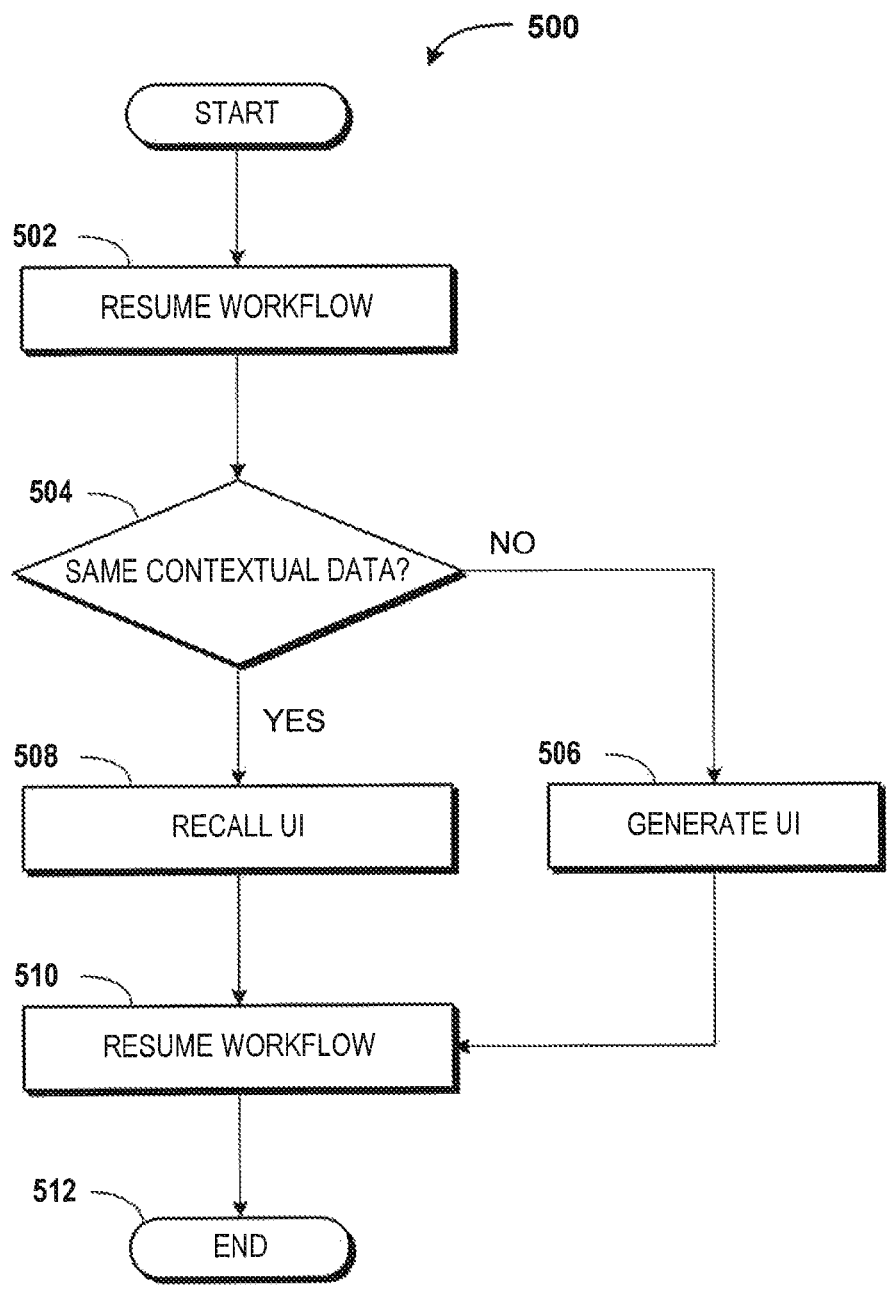
FIG. 5 is a flow diagram showing aspects of a method for continuing execution of a workflow, according to an exemplary embodiment.

Turning now to FIG. 5, aspects of a method 500 for resuming execution of the workflow 140 will be described in detail. The method 500 begins at operation 502, wherein execution of the workflow 140 is resumed. As will be appreciated from the description herein of FIGS. 1-4, a workflow 140 may be resumed after being interrupted or shared. The task engine 122 can detect resumption of a workflow 140 by detecting a login associated with the workflow 140, by detecting submission of an access code or access of a link associated with the workflow 140, or by other means. In some embodiments, the workflow 140 is executed in parallel by two or more users. As such, the operation 502 includes not only resuming execution of interrupted workflows 140, but also access of a workflow 140 via a shared access code or other method of accessing a shared workflow 140.

From operation 502, the method 500 proceeds to operation 504, wherein the task engine 122 determines if the contextual data 126 associated with the workflow 140 is the same as contextual data 126 associated with the device resuming execution of the workflow 140. As mentioned above, a user or device may interrupt execution of a workflow 140 being accessed with a first device, and resume execution of the workflow 140 with a second device. The task engine 122 can be configured to access contextual data 126 associated with a device resuming execution of the workflow 140, and to compare that data with contextual data 126 corresponding to a device that initiated execution of the workflow 140.

If the task engine 122 determines in operation 504 that the contextual data 126 associated with the device resuming execution of the workflow 140 is not the same as the contextual data 126 associated with the workflow 140, the method 500 proceeds to operation 506, wherein the task engine 122 generates a new UI for presentation to a user associated with the device resuming execution of the workflow 140. It should be understood that generating the UI in operation 506 can be, but is not necessarily, substantially similar to generating the UI in operation 308 described above with reference to FIG. 3.

If the task engine 122 determines in operation 504 that the contextual data 126 associated with the device resuming execution of the workflow 140 is the same as the contextual data 126 associated with the workflow 140, the method 500 proceeds to operation 508, wherein the task engine 122 recalls the UI associated with the workflow 140. From operation 506 and operation 508, the method 500 proceeds to operation 510, wherein execution of the workflow 140 is resumed. From operation 510, the method 500 proceeds to operation 512. The method 500 ends at operation 512.

It should be understood that in accordance with the concepts and technologies disclosed herein, the source or brand of particular applications and/or tasks can be deemphasized, and the functionality associated with a particular task and/or application can be emphasized. In other words, UIs can be tailored based upon functionality associated with tasks and/or workflows 140, and not hard coded by application and/or task developers.

Similarly, UIs can be configured based upon functionality and not necessarily the source of applications, tasks, and/or workflows 140 for providing the functionality. Thus, location and/or configuration of UI controls in UIs can be based upon underlying functionality such as associated tasks and workflows 140, and therefore can be consistent even if a task associated with a particular source is unavailable. Thus, for example, a UI for viewing streaming video content may include a UI control for streaming a movie. Depending upon the movie searched for and/or selected for streaming, one or more sources of the movie may not be available. Thus, a UI control for streaming the video may be located in a consistent location on a UI, but may be associated with one or more sources of the task for streaming the content. This example is illustrative, and should not be construed as being limiting in any way.

In some embodiments, application or task developers can specialize in tasks instead of, and/or in addition to, specializing in a particular application. For example, multiple applications exist for providing image editing. Some image editing applications include similar features, though some features may vary between the applications. Users may purchase one application over another based upon a subset of functionality. In accordance with the concepts and technologies disclosed herein, users can access tasks associated with multiple application developers. Thus, application developers can focus, if desired, upon tasks that set their services and/or products apart from other application developers.

In some embodiments, some tasks of workflows 140 can be automated and/or data associated with those tasks can be populated automatically. For example, a user may specify preferences, or a task engine 122 can determine those preferences over time, and those preferences can be used to drive data generation associated with and/or execution of the tasks. As such, users may specify preferences for almost any tasks, where those preferences are used to drive execution of tasks and/or data used to execute those tasks.

Some workflows 140 and/or tasks of workflows 140 can be configured to execute for long periods of time and/or until interruption. For example, a user may specify a workflow 140 for a product search, historical data generation and/or tracking, and the like, and the workflow 140 can execute until it expires and/or until interrupted by the user. In some embodiments, data associated with the workflows 140 can be made available to any other tasks and/or workflows 140 associated with the user, such that these data can be used to drive execution of other tasks or workflows 140 associated with the user.

In some embodiments, data corresponding to workflows 140 and/or task execution associated with a user's trusted social networking connections or other entities can be used for task or workflow execution associated with a user. Thus, for example, a user may associate a workflow 140 or task with a trusted entity, and data associated with the trusted entity can be used with respect to execution of the task or workflow 140.

Figure 6:
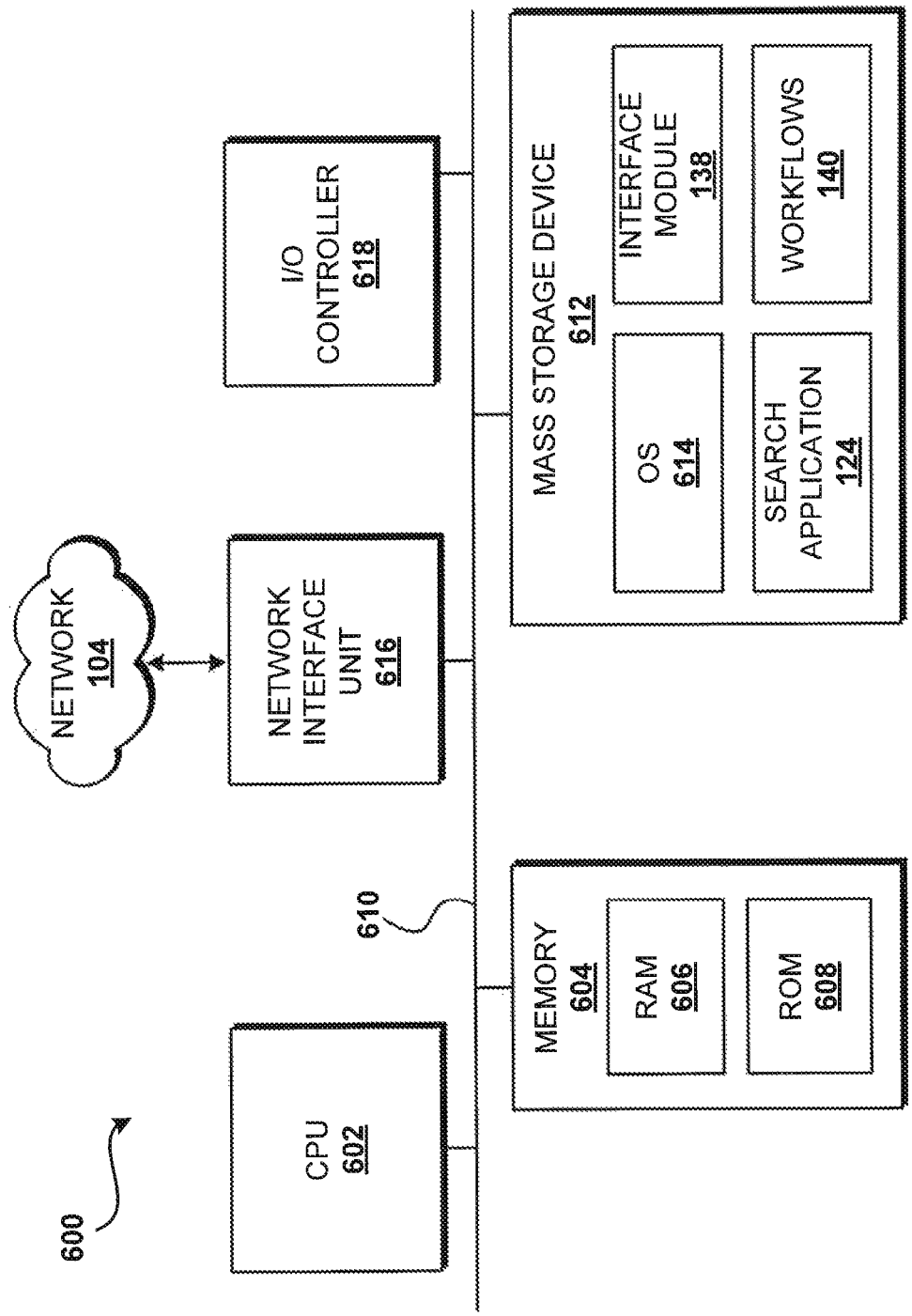
FIG. 6 is a computer architecture diagram illustrating an exemplary computer hardware and software architecture for a computing system capable of implementing aspects of the embodiments presented herein.

FIG. 6 illustrates an exemplary computer architecture 600 for a device capable of executing the software components described herein for interacting with contextual and task-based computing environments. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, the search application 124, the interface module 138, and the workflows 140. Although not shown in FIG. 6, the mass storage device 612 also can be configured to store the task data 112, if desired.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium" and variations thereof, does not include waves, signals, and/or other transitory and/or intangible communication media, per se.

According to various embodiments, the computer architecture 600 may operate in a networked environment using logical connections to remote computers through a network such as the network 104. The computer architecture 600 may connect to the network 104 through a network interface unit 616 connected to the bus 610. It should be appreciated that the network interface unit 616 also may be utilized to connect to other types of networks and remote computer systems, for example, the server computer 102, the discovery engine 108, the data store 114, the SN server 116, and/or other devices and/or networks. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Based on the foregoing, it should be appreciated that technologies for contextual and task-focused computing have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for task-focused computing, the computer-implemented method comprising performing computer-implemented operations for:
    detecting an interaction between a client and an application;
    obtaining contextual data associated with the client, the contextual data describing the interaction, the application, and content associated with the interaction;
    querying task data to identify relevant tasks comprising tasks expected to be relevant to the client based, at least in part, upon the contextual data, wherein the relevant tasks include a task available to the client by a plurality of different applications including the application;
    configuring a user interface of the application to generate a menu having user interface controls for accessing the relevant tasks by the application and the task by the plurality of different applications, wherein the user interface is configured to arrange the user interface controls within the menu according to a ranked order, wherein the ranked order is based on a relevance of the user interface controls to the contextual data, wherein a size and a layout of the menu is determined based on the ranked order, and wherein selection of the user interface controls causes the client to access the corresponding relevant tasks;
    causing the client to access a workflow generated based on the relevant tasks and the contextual data;
    causing an execution of the workflow;
    determining if execution of the workflow is interrupted; and
    in response to determining that execution of the workflow is interrupted, storing workflow progress data associated with the workflow.

2. The method of claim 1, wherein the user interface controls comprise workflow user interface control, the selection of which causes the client to access the workflow.

3. The method of claim 1, wherein the workflow comprises a batch of tasks.

4. The method of claim 2, further comprising receiving data indicating a selection of the workflow user interface control, and wherein the execution of the workflow is based, at least in part, on the data indicating the selection of the workflow user interface control.

5. The method of claim 1, further comprising sharing information relating to the workflow with a remote device to enable the remote device to access the workflow.

6. The method of claim 1, wherein the workflow progress data comprises
    data identifying the workflow,
    data identifying progress in execution of the workflow,
    data describing contextual data associated with the workflow, and
    data describing the user interface used to interact with the workflow.

7. The method of claim 1, further comprising:
    resuming execution of the workflow;
    determining if contextual data associated with a device resuming execution of the workflow is substantially similar to contextual data associated with the workflow; and
    configuring a user interface for resuming execution of the workflow.

8. The method of claim 7, wherein configuring the user interface comprises providing the user interface described by the workflow progress data, in response to determining that the contextual data associated with the device resuming execution of the workflow is substantially similar to the contextual data associated with the workflow.

9. The method of claim 7, wherein configuring the user interface comprises generating a new user interface in response to determining that the contextual data associated with the device resuming execution of the workflow is not substantially similar to the contextual data associated with the workflow.

10. The method of claim 1, further comprising:
    categorizing the task data according to one or more tasks identified by the task data; and
    storing the categorized task data in a searchable format, the categorized task data being stored at a data storage device.

11. The method of claim 1, wherein the contextual data further comprises social networking data associated with a user of the client.

12. The method of claim 1, wherein the contextual data further comprises task usage history associated with a user of the client.

13. The method of claim 1, wherein the ranked order is based at least one of a usage history associated with the client, a popularity of the relevant tasks, one or more advertising fees paid by vendors associated with the relevant tasks, usage of the relevant tasks by social network members, a number of explicit searches for the relevant tasks, or other search or usage history of entities that have accessed the relevant tasks.

14. A computer-implemented method for task-focused computing, the computer-implemented method comprising performing computer-implemented operations for:
   interacting with an application, the application comprising a web-based application hosted by a server computer;
   exposing contextual data to a task engine, the contextual data comprising content data describing content associated with the interacting between the application and a client, social networking data associated with the client, and data describing the client;
   receiving data corresponding to a user interface of the application for interacting with relevant tasks, the relevant tasks comprising tasks for interacting with the content, wherein the relevant tasks include a task available to the client by a plurality of different applications including the application;
   displaying the user interface at the client, the user interface comprising a menu having a user interface controls corresponding to the relevant tasks and advertising, wherein the user interface is configured to arrange the user interface controls within the menu according to a ranked order, wherein the ranked order is based on a relevance of the interface controls to the contextual data, wherein a size and a layout of the menu is determined based on the ranked order;
   causing an execution of a workflow generated based on the relevant tasks and the contextual data; and
   sharing information relating to the workflow with another device to enable the another device to access the workflow.

15. The method of claim 14, wherein the relevant tasks comprise a workflow corresponding to a batch of tasks.

16. The method of claim 14, further comprising:
   receiving data indicating a selection of a user interface control from the user interface controls corresponding to the workflow, wherein the execution of the workflow is caused in response to the data indicating the selection of the user interfaced control.

17. A system comprising:
   one or more processors; and
   a computer-readable storage medium having computer readable instructions stored thereupon that, when executed by the one or more processors, cause the computer to:
      provide to a task engine data indicating an interaction at a client, the interaction comprising access of an application by the client;
      expose contextual data to the task engine, the contextual data comprising data describing an activity associated with the interaction and describing content associated with the interaction, social networking data, and a task usage history associated with the client;
      receive, from the task engine, data for accessing relevant tasks, the relevant tasks comprising a workflow and a task relevant to the activity and the content, wherein the task is available to the client by a plurality of different applications including the application;
      configure a user interface of the application to generate a menu having user interface controls for accessing the relevant tasks by the application and the task by the plurality of different applications, wherein the user interface is configured to arrange the user interface controls within in the menu according to a ranked order, wherein the ranked order is based on a relevance of the user interface controls to the contextual data, wherein a size and a layout of the menu is determined based on the ranked order;
      cause an execution of the relevant task according to the ranked order, the relevant task comprising the workflow;
      determine if execution of the workflow is interrupted;
      in response to determining that execution of the workflow is interrupted, store workflow progress data comprising data identifying the workflow, data identifying progress in execution of the workflow, data describing contextual data associated with the workflow, and data describing the user interface used to interact with the workflow; and
      resume execution of the workflow.

18. The system of claim 17, wherein the task usage history further comprises task usage history associated with a user of the client.

19. The system of claim 17, wherein the workflow comprises a batch of tasks.

20. The system of claim 17, wherein the social networking data further comprises social networking data associated with a user of the client.

* * * * *